United States Patent [19]

Suzuki et al.

[11] Patent Number: 4,945,433
[45] Date of Patent: Jul. 31, 1990

[54] EJECTING MECHANISM OF DISK CARTRIDGES

[75] Inventors: Masayuki Suzuki, Tokyo; Hirokimi Iwata, Ibaragi, both of Japan

[73] Assignee: Sony Corporation, Tokyo, Japan

[21] Appl. No.: 241,618

[22] Filed: Sep. 8, 1988

[30] Foreign Application Priority Data

Sep. 21, 1987 [JP] Japan .................. 62-236954

[51] Int. Cl.⁵ ............... G11B 5/012; G11B 17/022
[52] U.S. Cl. .......................... 360/99.07; 360/99.02
[58] Field of Search ............... 360/98.04, 98.05, 98.06, 360/99.02, 99.03, 99.06, 99.07, 96.6, 96.5

[56] References Cited

U.S. PATENT DOCUMENTS

| | | | |
|---|---|---|---|
| 3,845,502 | 10/1974 | Paus | 360/86 |
| 4,539,613 | 9/1985 | Suyama et al. | 360/99.06 |
| 4,723,185 | 2/1988 | Maeda | 360/99.07 |
| 4,802,041 | 1/1989 | Uehura | 360/99.06 |
| 4,816,945 | 3/1989 | Watanabe | 360/99.07 |

FOREIGN PATENT DOCUMENTS 62-058450 3/1987 Japan .

*Primary Examiner*—David J. Severin
*Attorney, Agent, or Firm*—Ronald P. Kananen

[57] ABSTRACT

An ejecting mechanism for disk cartridges comprises an operating lever for moving a cartridge holder between a raised position where a disk cartridge is inserted in and ejected from the cartridge holder, and a lowered position where a disk within the inserted disk cartridge is mounted on and demounted from a turntable. A releasing lever is provided for unlocking the disk cartridge which has been locked by a locking lever, wherein when the cartridge holder with the disk cartridge is in its lowered position, the operating lever is pushed through a panel located in front of the ejecting mechanism to raise the cartridge holder. Just before the cartridge holder reaches its raised position, the releasing lever is driven to unlock the disk cartridge.

11 Claims, 9 Drawing Sheets

FIG. I

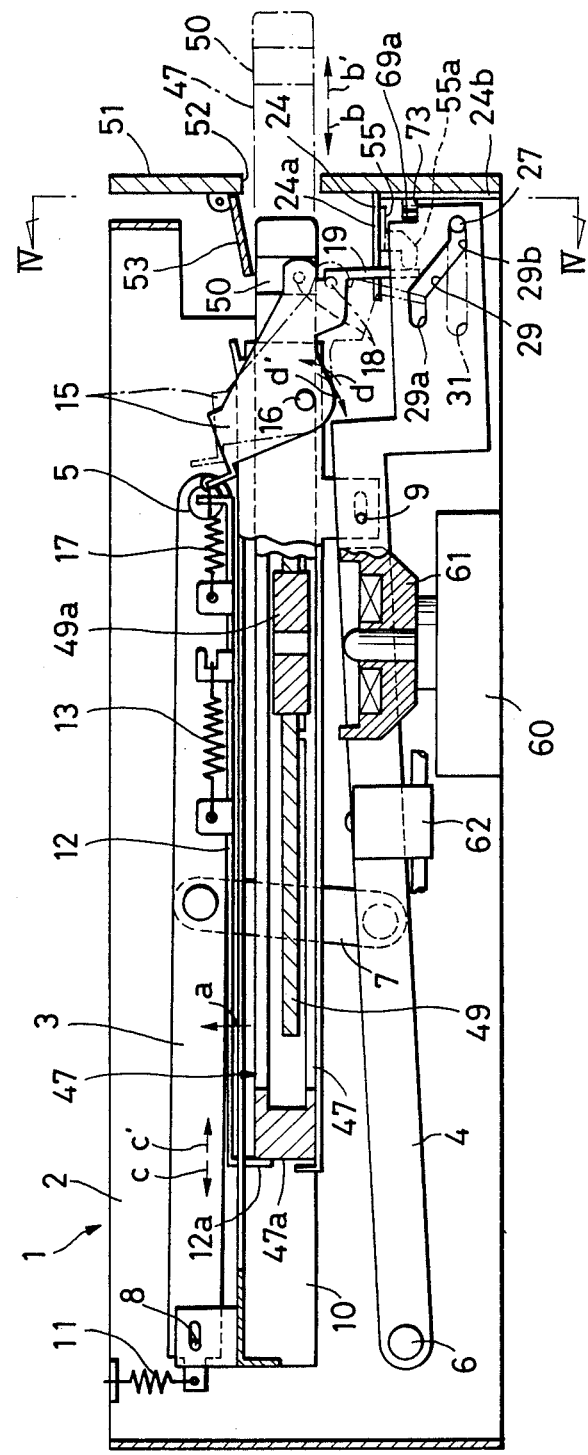

EJECTING MECHANISM OF DISK CARTRIDGES

BACKGROUND OF THE INVENTION

1. Field of the Invention

This invention relates generally to an ejecting mechanism of disk cartridges, and particularly to an ejecting mechanism of disk cartridges incorporated in a disk recording and/or reproducing apparatus.

2. Description of Prior Art

In a conventional disk recording and/or reproducing apparatus, for example, as disclosed in U.S. Pat. No. 3,845,502, a disk cartridge is inserted in a cartridge holder after in its raised position by hand, until the disk cartridge reaches a predetermined position in the cartridge holder, and after the cartridge holder is moved downwards by a motor of the apparatus, the disk within the disk cartridge is mounted on a turntable.

When the disk cartridge is ejected, the motor is driven again so as to raise the cartridge holder, so that the disk cartridge is ejected from the cartridge holder located in its raised position. Thereafter, the disk cartridge is withdrawn from the apparatus, and is stored.

However, in such an ejecting mechanism as described above, the disk cartridge cannot be ejected from the apparatus when the electric current is off, or the motor is damaged, so that in general, it is required to enable such a device as to eject the disk cartridge to eject even at a time of electricity failure or other troubles.

In an disk recording and/or reproducing apparatus disclosed in Japanese Laid Open Patent No. 62-58450, the disk is set on a tray and withdrawn into the apparatus so as to be mounted on a turntable provided in the apparatus. Thereafter, the disk is pressed against and rotated together with the turntable by a presser that is supported by a swingable arm provided in the apparatus.

When it is required to manually eject the disk, reduction gears are rotated with a tool, such as a screw driver or the like, from the outside of the apparatus, so as to swing the swingable arm.

However, the screw driver or the like is not available in general in such an office as the apparatus of this type is installed, and even though it has been prepared, it is very troublesome to rotate the reduction gears with the screw driver or the like. Further, the above ejecting mechanism is very complicated in structure, and its production cost is also substantial.

OBJECTS AND SUMMARY OF THE INVENTION

Accordingly, it is an object of the present invention to provide an ejecting mechanism for disk cartridges which avoids the previously described disadvantages of the prior art.

More specifically, it is an object of this invention to provide an ejecting mechanism for disk cartridges in which only a small number of parts are only added to the conventional ejecting mechanism, and nevertheless, the disk cartridge is manually ejected in a simple operation without using any special tools under an unordinary condition.

A further object of the invention is to provide an ejecting mechanism for disk cartridges, which is very simple in structure, very reliable in operation, and can be produced at a very low cost.

In accordance with an aspect of this invention, an ejecting mechanism for disk cartridges comprises a cartridge holder movable between a raised position where a disk cartridge is inserted in and ejected from the cartridge holder through a cartridge insertion opening provided in a panel surrounding the ejecting mechanism, and a lowered position where a disk accommodated in the disk cartridge is mounted on a turntable. An operating lever is movable in the same direction as the disk cartridge is inserted and ejected, so as to raise and lower the cartridge holder. A driving member is driven by a motor and engaged with the operating lever to move the operating lever. A disengaging member is provided for disengaging the operating lever from the driving member, while a locking member is provided for locking the disk cartridge inserted in the cartridge holder; a releasing lever is provided for unlocking the disk cartridge which has been locked by the locking lever, wherein when the operating lever is moved to a second position where the cartridge holder is in the lowered position thereof, the disengaging member is put in action by a pushing operation from the front side of the panel to disengage the operating lever from the driving member. In succession, the operating lever is moved, by the pushing operation, to a first position where the cartridge holder reaches the raised position. Further, just before the cartridge holder reaches the raised position, the releasing lever is driven so as to unlock the disk cartridge which has been locked by the locking member.

BRIEF DESCRIPTION OF THE DRAWINGS

FIG. 3A is a sectional side view of the apparatus of FIG. 2, showing the cartridge holder located in a raised position thereof;

DETAILED DESCRIPTION OF A PREFERRED EMBODIMENT

Figure 1:
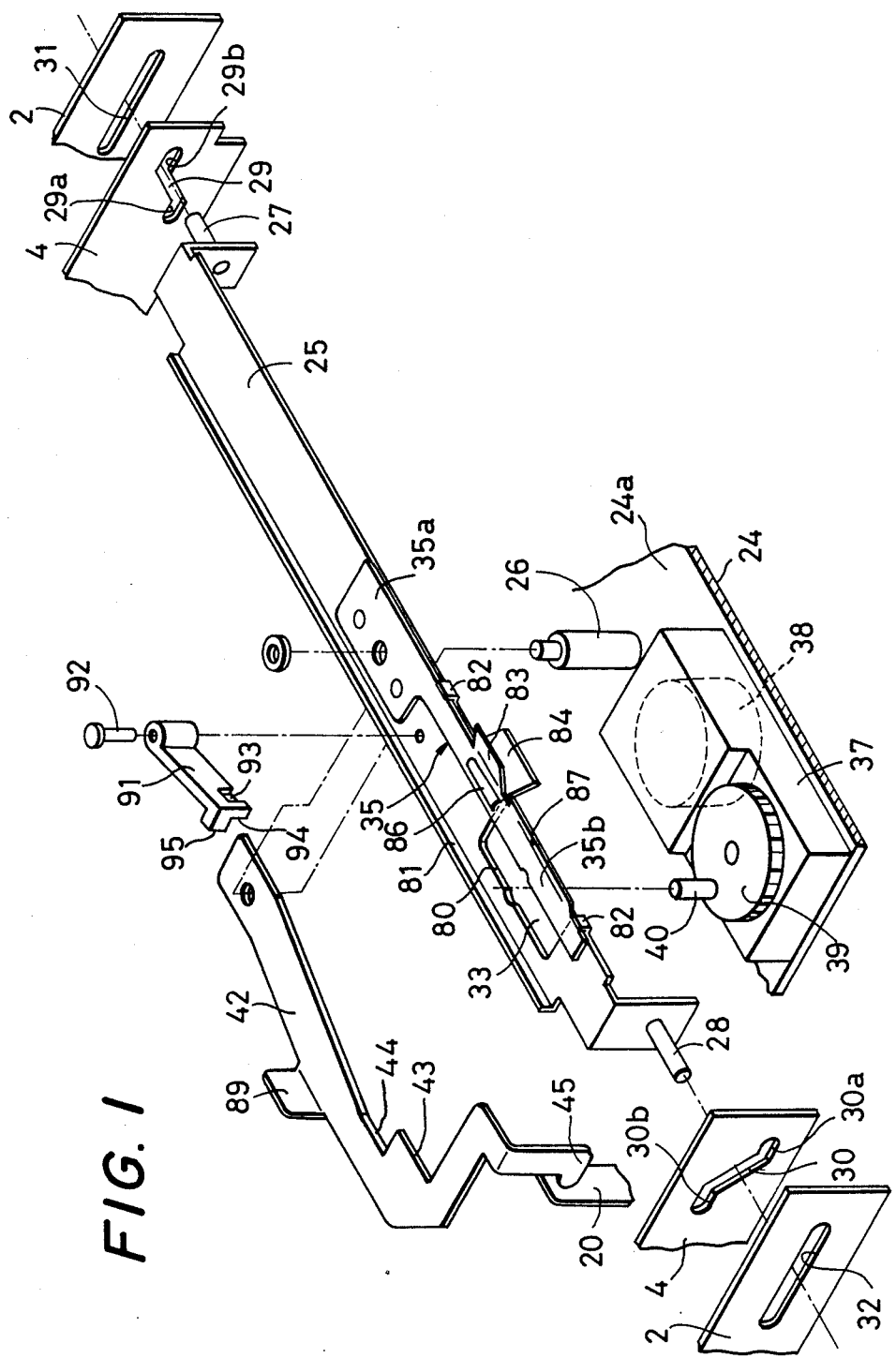
FIG. 1 is an exploded, perspective view, from the bottom, of a principal portion of a disk recording and/or reproducing apparatus with an ejecting mechanism for disk cartridges according to an embodiment of this invention.

Referring to the drawings in detail, and initially to FIGS. 2 to 4, a disk recording and/or reproducing apparatus 1 provided with an ejecting mechanism of disk cartridges according to an embodiment of this invention will be described.

Figure 2:
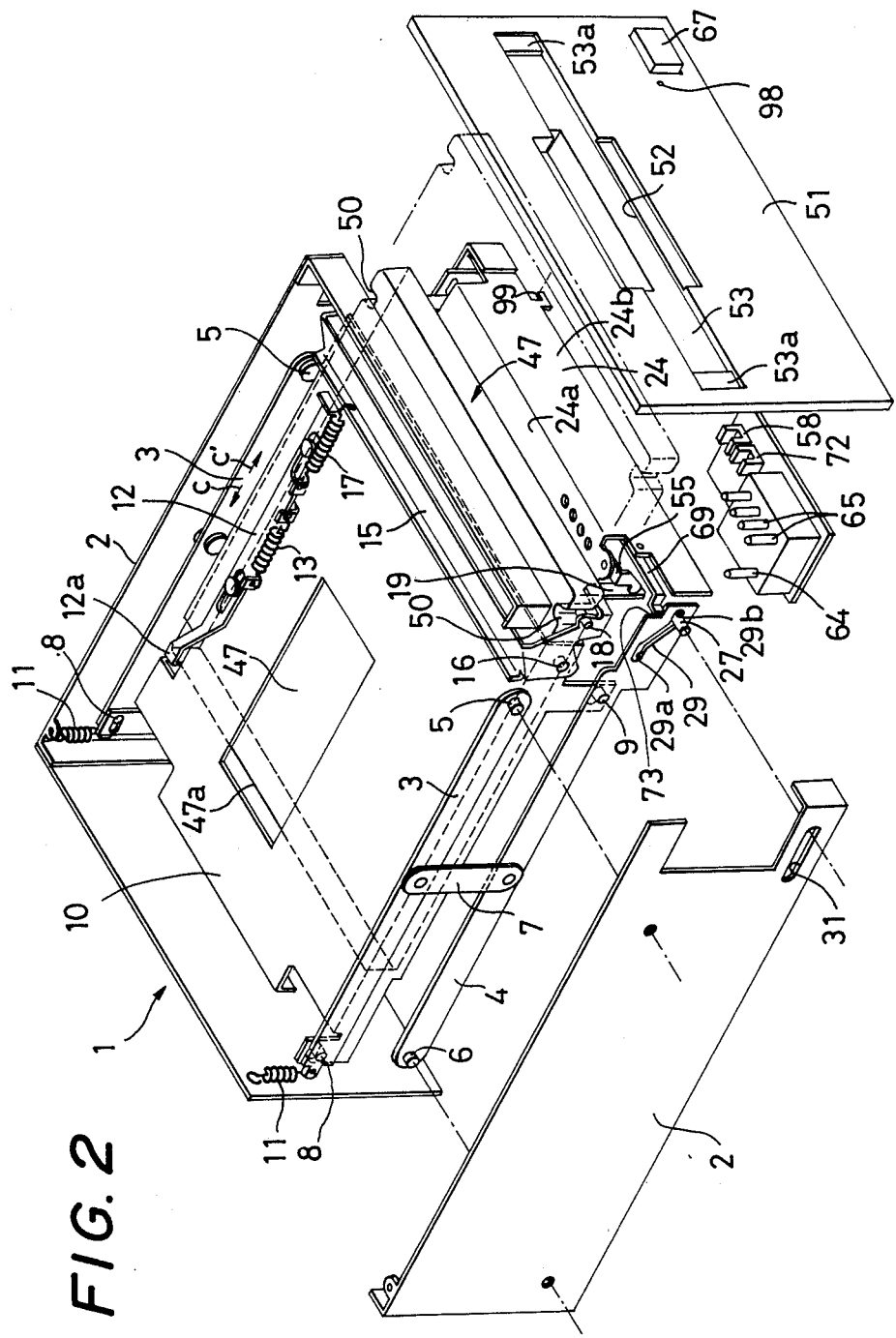
FIG. 2 is an exploded, perspective view of the apparatus of FIG. 1.

As shown in FIG. 2, a pair of upper and lower links 3 and 4 are provided within right and left side panels 2 which compose the housing of the apparatus 1. The links 3 and 4 are swung upwards and downwards on respective fulcrums 5 and 6 provided on the side panel 2, and connected with each other by a link 7 substantially at their central portions. Further, a cartridge holder 10 is supported on both of its sides by the links 3 and 4 through pins 8 and 9 which project from the rear ends of the links 3 and the front ends of the links 4, respectively. Thus, when the links 3 and 4 are swung upwards and downwards, the cartridge holder 10 is moved in the direction of arrow a in FIG. 3A and an arrow a' in FIG. 3B between its raised position and its lowered position. In addition, the cartridge holder 10 is urged upwards by the force of a tension coiled spring 11 stretched between the rear end of the link 3 and the side panel 2.

As shown in FIG. 2, a slider 12 is provided on one side of the upper face of the cartridge holder 10, so as to be moved forwards and rearwards (in the direction of arrows c and c' in FIG. 3A) along the cartridge holder 10, and is urged in the direction of the arrow c' by a tension coiled spring 13 stretched between the slider 12 and the cartridge holder 10. Further, the rear end 12a of the slider 12 is bent downwards, so as to project into the cartridge holder 10.

As shown in FIG. 3A, a locking member 15 is mounted, swingably in a direction of arrows d and d', on the front end of the cartridge holder 10 through right and left pivots 16. The pivots project from the locking member 15, and are fitted in respective holes provided in the side walls of the cartridge holder 10. Further, the locking member 15 is urged in the direction of the arrow d by the force of a tension coiled spring 17 which is stretched between the locking member 15 and the slider 12. From the respective ends of the locking member 15, a pair of right and left pins 18 project in parallel with the pivots 16, and a pair of lugs 19 and 20 extend downwards.

Figure 4:
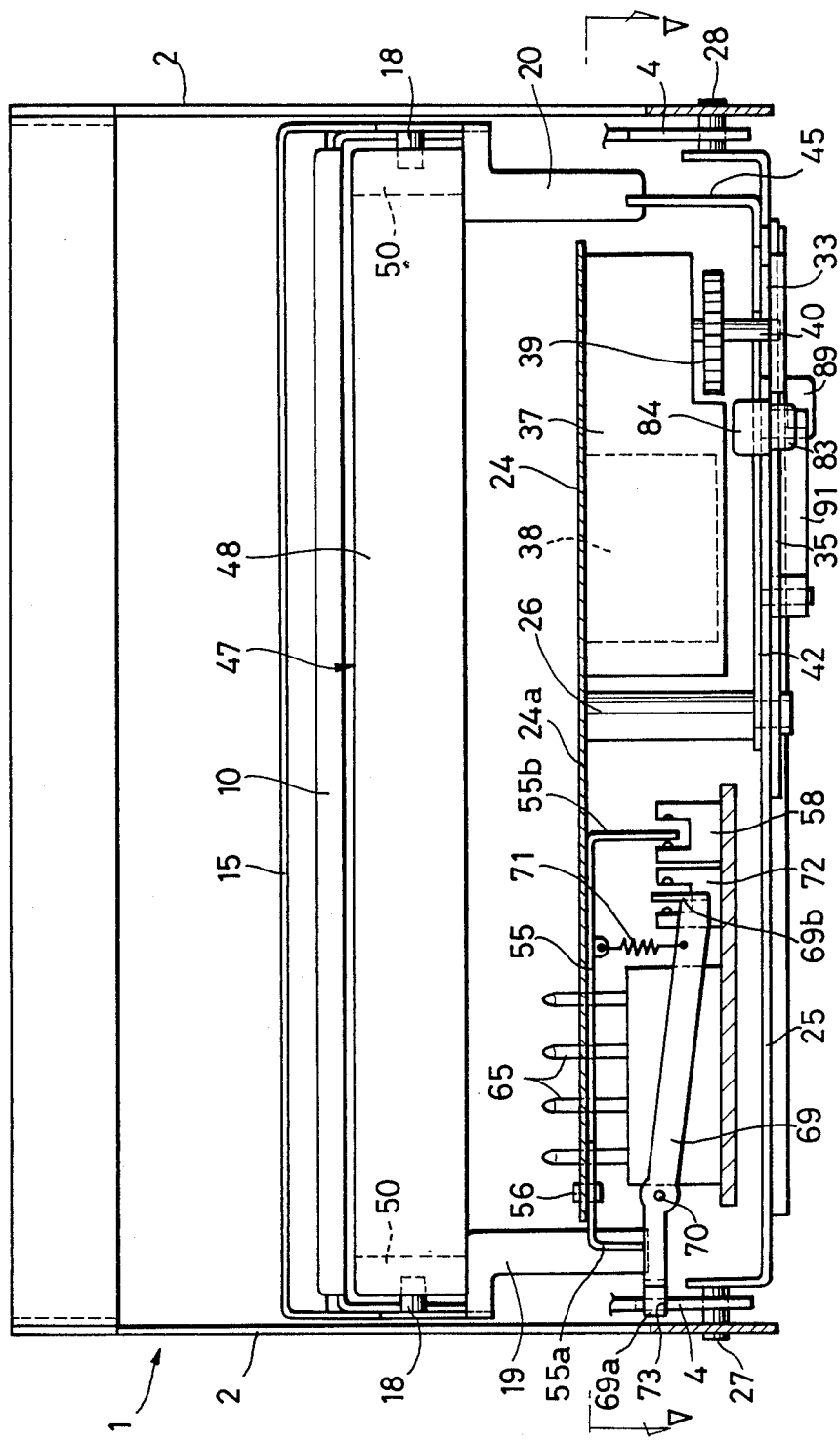
FIG. 4 is a sectional view taken along the line IV—IV on FIG. 3A.
Figure 5A:
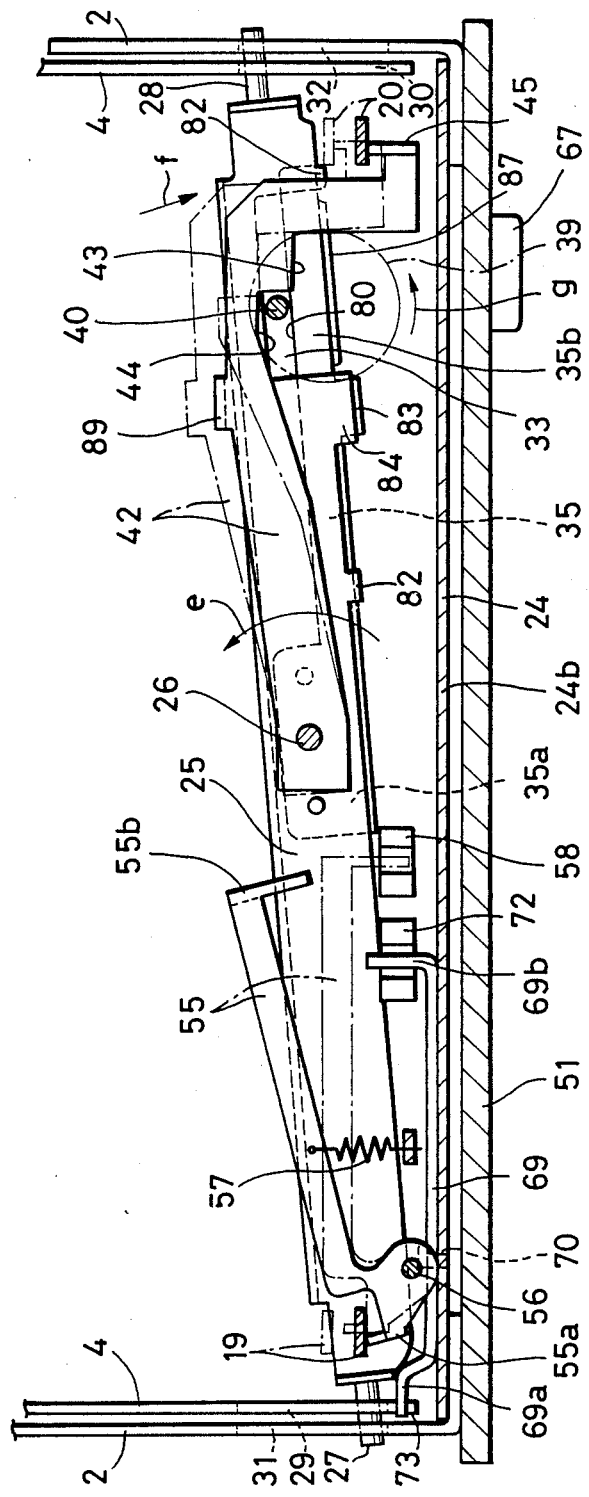
FIG. 5A is a sectional view taken along the line V—V on FIG. 4, showing an operating lever moved to a first position thereof.
Figure 5B:
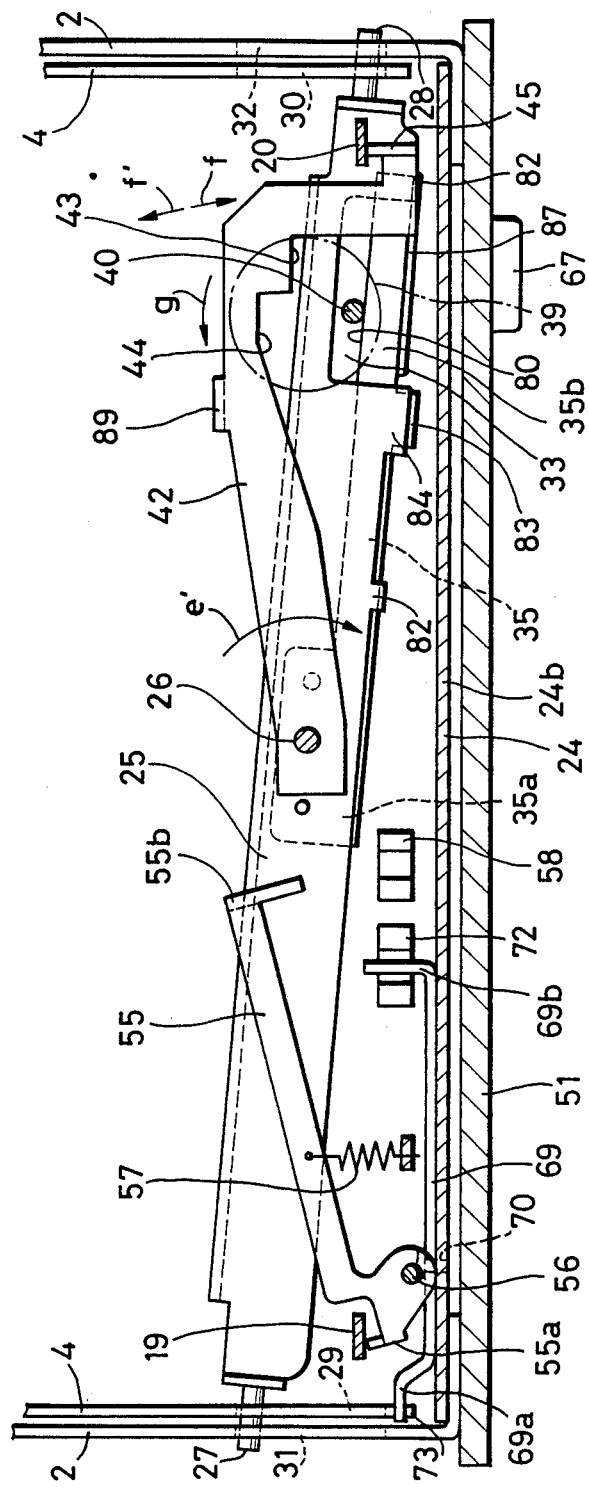
FIG. 5B is a sectional view taken along the line V—V on FIG. 4, showing the operating lever moved to a second position thereof; p

Next, as shown in FIGS. 4 to 5B, an adapter plate 24, having an L-shape in section, is provided on the front side of the apparatus 1, and an operating lever 25 is arranged under the horizontal portion 24a of the adapter plate 24. The operating lever 25 is suspended in the central portion thereof on a shaft 26 which projects from the horizontal portion 24a of the adapter plate 24, and is swung in a direction of the arrow e in FIG. 5A and the arrow e' in FIG. 5B.

A pair of pins 27 and 28 projecting from the respective ends of the operating lever 25, are inserted in both respective inclined guide slots 29 and 30 provided at the front ends of the links 4, and respective horizontal guide slots 31 and 32 provided at the front ends of the side panels 2. The two inclined guide slots 29 and 30 are inclined in reverse direction to each other.

As shown in FIGS. 1 and 4, a drive assembly 37 is secured to the lower face of the horizontal portion 24a of the adapter plate 24, and a gear 39 is rotated by a motor 38 of the drive assembly 37. A driving member, such as a pin 40, projects downwards from an eccentric position of the gear 39, and is fitted in an opening 33 which is formed by a rectangular recess 80 provided in the operating lever 25 apart from the center thereof, and a leaf spring or disengaging member 35 described later.

As shown in FIGS. 5A and 5B, a releasing lever 42 is arranged along the upper face of the operating lever 25 and is swung on the shaft 26 in a direction of the arrows f and f'. Further, provided in the releasing lever 42 are a step 43 for enabling the driving member 40 to push the releasing lever 42, and a recess 44 for preventing the releasing lever 42 from being pushed by the driving member 40, and the releasing lever is bent upwards at the free end thereof to form a lug 45, which abuts against the lug 20 of the locking member 15.

Next, the functioning of the disk recording and/or reproducing apparatus for the disk cartridge 47 to be loaded therein and ejected therefrom will be described.

Before loading of the disk cartridge 47, the operating lever 25 is in a first position shown in FIG. 5A, in which the pins 27 and 28 of the operating lever 25 are located in lower horizontal portions 29b and 30b of the inclined guide slots 29 and 30 as shown in FIGS. 1 and 3A, respectively. Thus, the cartridge holder 10 is located in its raised position due to the motion of the links 3 and 4 swung upwards by the operating lever 25, which is in the first position after being rotatively moved in the direction of the arrow e shown in FIG. 5A. In the raised position of the cartridge holder 10, the slider 12 is in a state of being urged in the direction of arrow c' by the force of the spring 13, so that the locking member 15 is in a state of being swung in the direction of arrow d'.

When the disk cartridge 47, in which a disk 49 is rotatably accommodated, is horizontally inserted in the direction of arrow b in FIG. 3A through a cartridge insertion opening 52 provided in the front panel 51 of the apparatus 1, the edge 47a lying ahead of the disk cartridge 47, which is gradually inserted in the cartridge holder 10, pushes the rear end 12a of the slider 12, so that the slider 12 is moved in the direction of arrow c against the force of the spring 13, and the locking member 15 pulled by the slider 12 through the spring 17 is swung in the direction of arrow d so as to have the pins 18 pressed against the lower face of the disk cartridge 47.

It is to be noted that a lid 53 is hinged on the back side of the cartridge insertion opening 52, and opened due to a push of the edge 47a of the disk cartridge 47. Further, it is also to be noted that a pair of projections 53a are provided on the right and left sides of the front face of the lid 53 as shown in FIG. 2, lest the lid 53 should abut all along the line against the edge 47a of the disk cartridge 47, and thereby, should be damaged.

Next, when the disk cartridge 47 reaches a completely inserted position indicated in solid lines in FIG. 3A, the pins 18 of the locking member 15 engage with a pair of recesses 50 formed on the right and left sides of the disk cartridge 47, so that the disk cartridge 47 is locked within the cartridge holder 10. Further, as the locking member 15 is swung in the direction of arrow d, the lug 20 of the locking member 15 moves from a position indicated in chain-dotted lines to a position indicated in solid lines in FIG. 5A, so that the lug 45 of the releasing lever 42 is pushed and the releasing lever 42 is swung in the direction of arrow f.

At that time, as the releasing lever 42 has the recess 44, the driving member 40 does not come in contact with the releasing lever 42, and further, while the lug 20 of the locking member 15 pushes the lug 45 of the releasing lever 42, the lug 19 of the locking member 15 also pushes a lug 55a provided one end of a lever 55, which is swung on a pivot 56 projecting from the horizontal portion 24a of the adapter plate 24, so that the lever 55 is swung against the force of a tension coiled spring 57, and the other end 55b of the lever 55 gets out of a sensor 58. Thus, the sensor 58 functions.

Figure 3B:
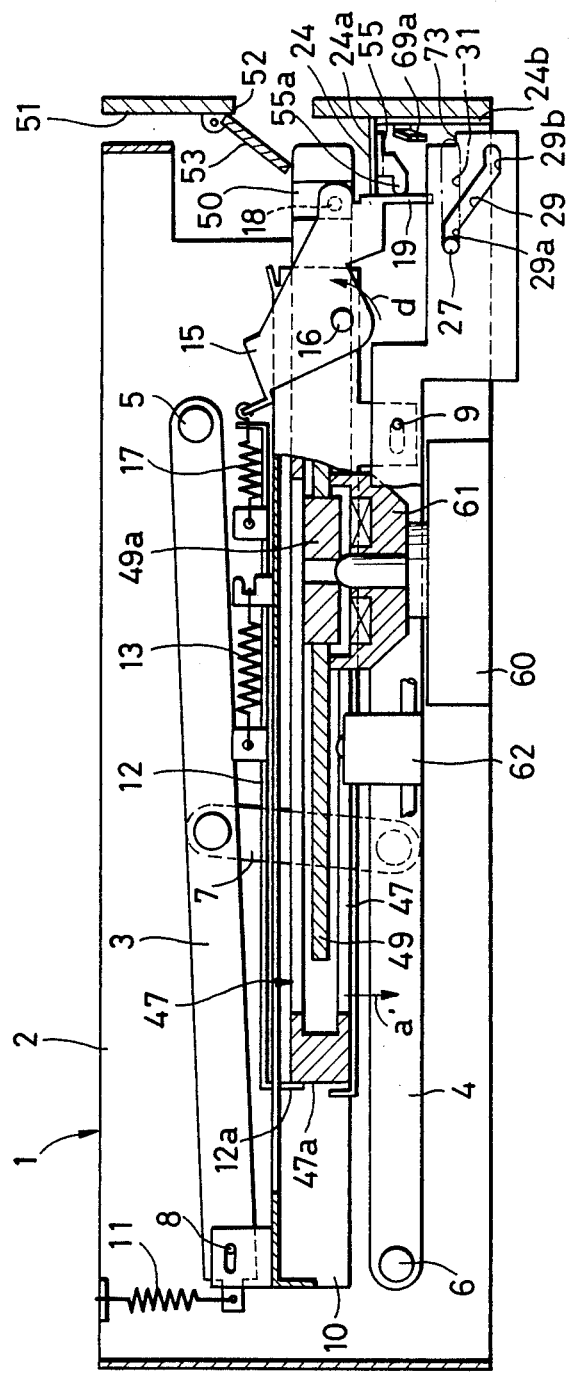
FIG. 3B is a sectional side view of the apparatus of FIG. 2, showing the cartridge holder located in a lowered position thereof.

As the result, the gear 39 is rotated in a direction of arrow g by the motor 38, so that the loading of the disk cartridge 47 is started. That is, due to a half rotation of the gear 39 in the direction of arrow g, the operating lever 25 pushed by the driving member 40, is swung in the direction of arrow e' as shown in FIG. 5B toward its second position, and thereby, the pins 27 and 28 of the operating lever 25 are moved to upper horizontal portions 29a and 30a of the inclined guide slots 29 and 30 as shown in FIGS. 1 and 3B, so that the links 3 and 4 are swung downwards, and the cartridge holder 10 is lowered in the direction of arrow a'. Thus, the center core 49a of the disk 49 is horizontally mounted on a turntable 61 which is driven by a motor 60.

The disk 49 is rotated by the motor 60 and an optical head 62 is moved in the radius direction of the disk 49, so that a requested recording or reproducing is performed.

It is to be noted that while the disk cartridge 47 is lowered, detected portions (not shown) provided in the disk cartridge 47 are detected by detecting pins 64, 65, etc. shown in FIG. 2, and information about prevention of mis-erasing, the kind of disks and so forth is obtained.

Next, when an ejection button 67 provided in the front panel 51 of the apparatus 1, is pressed after the end of recording or reproducing, the gear 39 located as shown in FIG. 5B is rotated by half in the direction of arrow g, so that the operating lever 25 is swung in the direction of arrow e by the driving member 40 as shown in FIG. 5A, and located in the first position thereof, and thereby, the cartridge holder 10 is raised in the direction of arrow a as shown in FIG. 3A.

In the meantime, just before the cartridge holder 10 reaches its raised position, the driving member 40 pushes the step 43 of the releasing lever 42, so that the releasing lever 42 is swung in the direction of arrow f' and located in a position indicated in chain-dotted lines in FIG. 5A. Thus, the lug 45 of the releasing lever 42 pushes the lug 20 of the locking member 15 to make the locking member 15 swing in the direction of arrow d' as shown in FIG. 3A, so that the disk cartridge 47 within the cartridge holder 10 is unlocked.

As the result, the slider 12 is moved in the direction of arrow c' due to the force of the spring 13, and the rear end 12a of the slider 12 pushes the edge 47a of the disk cartridge 47 to eject the disk cartridge 47 in a direction of arrow b' from the apparatus 1 through the cartridge insertion opening 52.

In the meantime, ascending of the cartridge holder 10 is detected as follows. As shown in FIG. 4, provided is a lever 69, one end 69a of which abuts against the front stepped end 73 of the link 4; when the lever 69 is swung on a fulcrum 70 against the force of a tension coiled spring 71, the other end 69b of the lever 69 is inserted in a sensor 72, which informs of the ascending of the cartridge holder 10.

Figure 6:
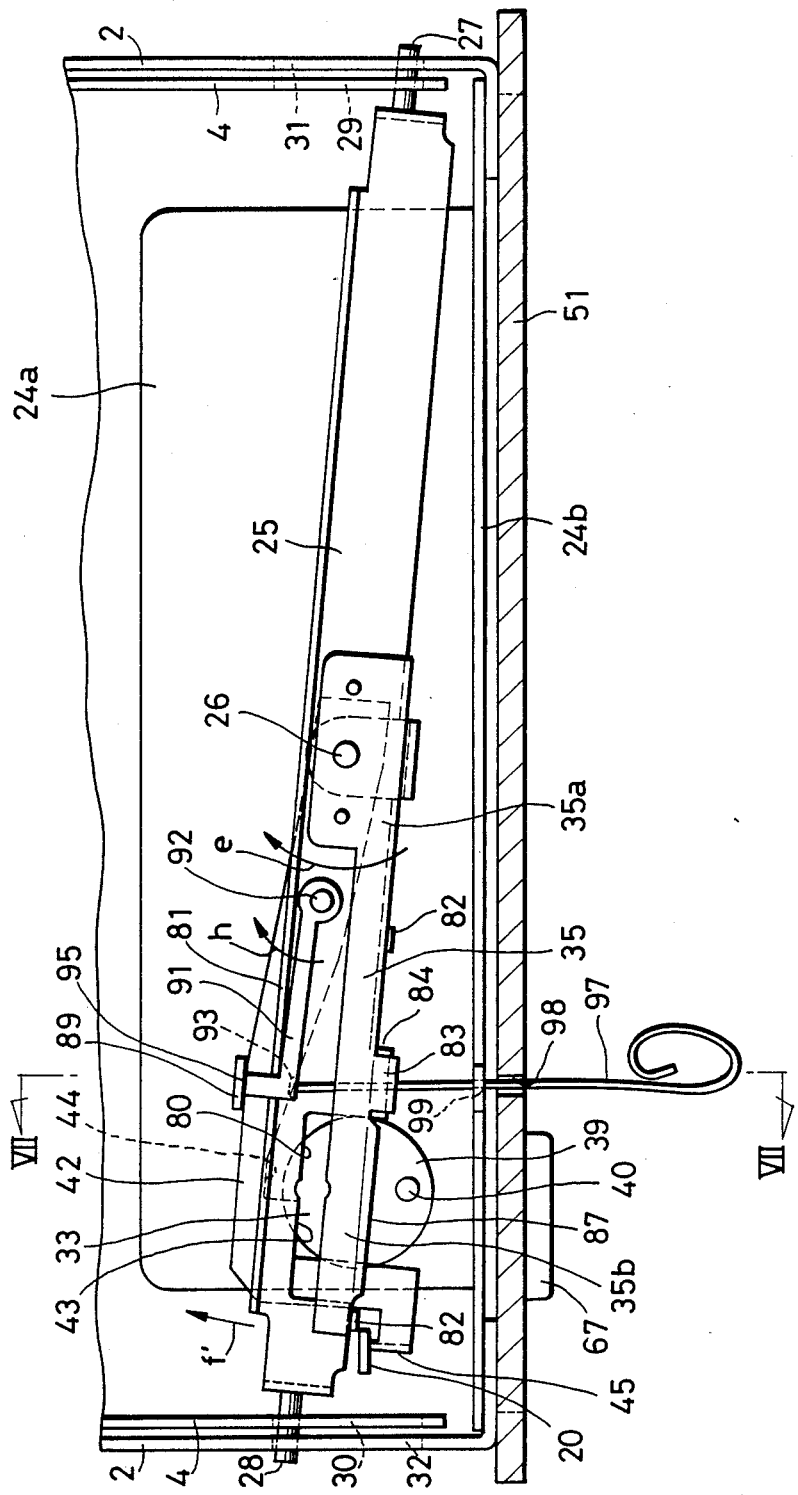
FIG. 6 is a partial bottom view of the apparatus of FIG. 2, showing the operation of the ejecting mechanism in unordinary state.

Next, an ejecting mechanism of the disk cartridge 47 used under an unordinary state will be As shown in FIG. 6, the leaf spring 35 extends along the lower face of the operating lever 25, and one end 35a of the leaf spring 35 is fixed to the central portion of the operating lever 25. Thus the opening 33 is formed by the free end 35b of the leaf spring 35, and the rectangular recess 80 of the operating lever 25. Further, as shown in FIG. 1, a flange 81 and a pair of vertically projecting lugs 82 are formed at the respective side edges of the operating lever 25, so as to prevent the leaf spring 35 from moving in the horizontal direction thereof, and make the leaf spring 35 movable only vertically downwards (as shown by the arrow i in FIG. 7B).

Figure 7A:
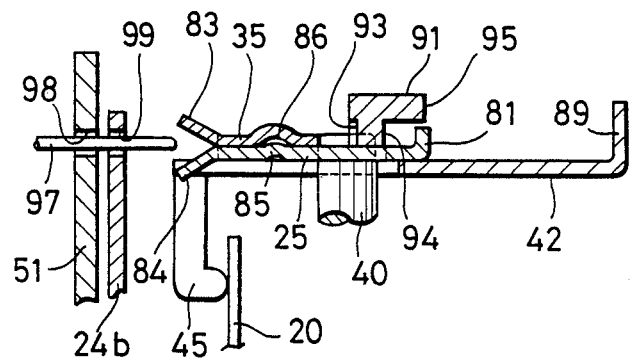
FIGS. 7A to 7C are sectional views taken along the line VII—VII on FIG. 6.

Next, as shown in FIG. 7A, a pair of adverse slant lugs 83 and 84 are formed at the side edges of the leaf spring 35 and operating lever 25, and further, a pair of embossed portions 86 and 85 lying one upon the other are formed near the pair of slant lugs 83 and 84 in the leaf spring 35 and operating lever 25. Moreover, as shown in FIG. 1, a slant lug 87 for leading the driving member 40 into the opening 33 extends from the side edge of the leaf spring 35 just opposite to the other side edge forming the edge of the opening 33.

As shown in FIG. 1, a push lever 91 swung on a fulcrum 92 is provided on the lower face of the operating lever 25. Disposed at the free end of the push lever 91 are a recess 93, a first push face 94 and a second push face 95, the first push face 94 being capable of pushing the flange 81 of the operating lever 25, and the second push face 95 being capable of pushing a lug 89 vertically projecting from the releasing lever 42.

Figure 7B:
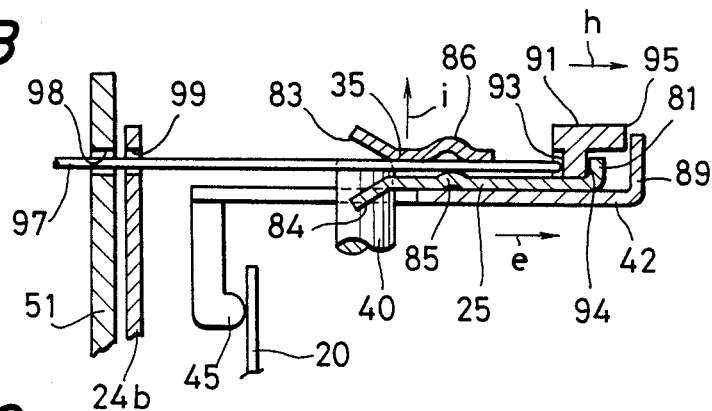

Next, the operation of ejecting the disk cartridge 47 under the unordinary state will be described on referring to FIGS. 7A to 7C.

In such a case that the disk 49 is left on the turntable 61, because the ejecting mechanism can not be automatically operated due to an electricity failure, a motor trouble or the like, a pin 97 is inserted into a hole 98 provided in the front panel 51 of the apparatus 1 as shown in FIG. 7A. The pin 97 passing through a hole 99 provided in the vertical portion 24b of the adapter plate 24, is, then, guided by the pair of slant lugs 83 and 84, and inserted between the leaf spring 35 and the operating lever 25 as shown in FIG. 7B.

As the result, the leaf spring 35 is bent in the direction of arrow i, and the driving member 40 located in the position shown in FIG. 5B, slips out of the opening 33, so that the operating lever 25 becomes free from the driving member 40. It is to be noted that the free end 35b of the leaf spring 35 is raised enough, because the pin 97 runs on the embossed portion 85 of the operating lever 25.

As the pin 97 further advances, the distal end of the pin 97 abuts against the recess 93 of the push lever 91, and as shown in FIG. 6, the push lever 91 is swung in a direction of arrow h. As the push lever 91 is further swung after the first face 94 abuts against the flange 81 of the operating lever 25, the operating lever 25 is swung in the direction of arrow e toward its second position, so that the cartridge holder 10 is raised.

Figure 7C:
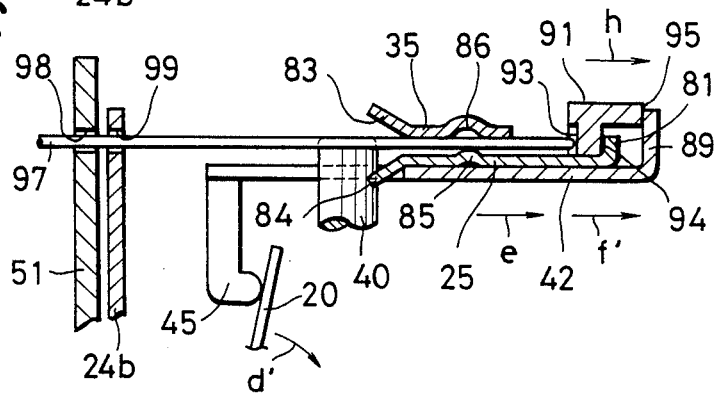

In the meantime, just before the cartridge holder 10 reaches its raised position, the second face 95 of the push lever 91 abuts against the lug 89 of the releasing lever 42 as shown in FIG. 7c, so that the releasing lever 42 is swung in the direction of arrow f' as shown in FIG. 6. Thus, the lug 45 of the releasing lever 42 pushes the lug 20 of the locking member 15, and thereby, the locking member 15 is swung to unlock the disk cartridge 47 within the cartridge holder 10. As the result, the disk cartridge 47 can be ejected from the apparatus 1.

It will be seen that even when the disk cartridge 47 is not automatically ejected due to the electricity failure or the like, the disk cartridge 47 can be manually ejected by the help of an ordinary pin only. Further, the push lever 91 pushes the operating lever 25 at first, and after a pertinent interval, pushes the releasing lever 42, so that the disk cartridge 47 is unlocked in good timing exactly in the same condition as the disk cartridge 47 is automatically unlocked.

In the meantime, when the gear 39 is driven after the disk cartridge 47 is manually ejected, the driving member 40 is easily entered in the opening 33 by the help of the slant lug 87.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An ejecting mechanism for disk cartridges comprising:
    a cartridge holder movable between a raised position where a disk cartridge is inserted in and ejected from said cartridge holder through a cartridge insertion opening provided in a panel surrounding said ejecting mechanism, and a lowered position where a disk accommodated in said disk cartridge is mounted on a turntable;
    an operating lever movable in the same direction as said disk cartridge is inserted and ejected, so as to raise and lower said cartridge holder;
    a driving member driven by a motor and engaged with said operating lever to move said operating lever;
    a disengaging member secured to said operating lever for disengaging said operating lever from said driving member;
    a locking member for locking said disk cartridge inserted in said cartridge holder;
    a releasing lever for unlocking said disk cartridge which has been locked by said locking lever; and
    means, when said operating lever is moved to a second position where said cartridge holder is in said lowered position thereof, for manually actuating said disengaging member by a pushing operation from a front side of said panel to disengage said operating lever from said driving member and in succession, for moving said operating lever by said pushing operation to a first position where said cartridge holder reaches said raised position and further, just before said cartridge holder reaches said raised position, for driving said releasing lever so as to unlock said disk cartridge which has been locked by said locking member.

2. An ejecting mechanism for disk cartridges comprising:
    a cartridge holder movable between a raised position where a disk cartridge is inserted in and ejected from said cartridge holder through a cartridge insertion opening provided in a panel surrounding said ejecting mechanism, and a lowered position where a disk accommodated in said disk cartridge is mounted on a turntable;
    an operating lever movable in the same direction as said disk cartridge is inserted and ejected, so as to raise and lower said cartridge holder;
    a driving member driven by a motor and engaged with said operating lever to move said operating lever;
    a disengaging member secured to said operating lever for disengaging said operating lever from said driving member;
    a locking member for locking said disk cartridge inserted in said cartridge holder; and
    a releasing lever for unlocking said disk cartridge which has been locked by said locking lever;
    wherein when said operating lever is moved to a second position where said cartridge holder is in said lowered position thereof, said disengaging member is put in action by a pushing operation from a front side of said panel to disengage said operating lever from said driving member; and in succession, said operating lever is moved, by said pushing operation, to a first position where said cartridge holder reaches said raised position; and further, just before said cartridge holder reaches said raised position, said releasing lever is driven so as to unlock said disk cartridge which has been locked by said locking member, wherein an opening that engages said driving member with said operating lever is formed by said disengaging member and a recess provided in said operating lever.

3. An ejecting mechanism for disk cartridges comprising:
    a cartridge holder movable between a raised position where a disk cartridge is inserted in and ejected from said cartridge holder through a cartridge insertion opening provided in a panel surrounding said ejecting mechanism, and a lowered position where a disk accommodated in said disk cartridge is mounted on a turntable;
    an operating lever movable in the same direction as said disk cartridge is inserted and ejected, so as to raise and lower said cartridge holder;
    a driving member driven by a motor and engaged with said operating lever to move said operating lever;
    a disengaging member secured to said operating lever for disengaging said operating lever from said driving member;
    a locking member for locking said disk cartridge inserted in said cartridge holder; and
    a releasing lever for unlocking said disk cartridge which has been locked by said locking lever;
    wherein when said operating lever is moved to a second position where said cartridge holder is in said lowered position thereof, said disengaging member is put in action by a pushing operation from a front side of said panel to disengage said operating lever from said driving member; and in succession, said operating lever is moved, by said pushing operation, to a first position where said cartridge holder reaches said raised position; and further, just before said cartridge holder reaches said raised position, said releasing lever is driven so as to unlock said disk cartridge which has been locked by said locking member,
    wherein a flange and vertically projecting lugs are formed at respective sides edges of said operating lever, so as to make said disengaging member movable only in a direction of disengaging said driving member from said operating lever.

4. An ejecting mechanism according to claim 3, in which slant lungs extend outwards from side edges of said operating lever and said disengaging member, respectively.

5. An ejecting mechanism according to claim 4, in which a push lever is swingably secured to said operating lever.

6. An ejecting mechanism according to claim 5, in which a first push face and a second push face are provided in said push lever.

7. An ejecting mechanism according to claim 6, in which by said pushing operation from the front side of said panel, said first push face of the push lever abuts against said flange of the operating lever to swing said operating lever toward said first position where said cartridge holder reaches said raised position, and just before said cartridge holder reaches said raised position, said second push face of the push lever abuts against a lug projecting from said releasing lever to swing said releasing lever, so that said disk cartridge is unlocked due to rotation of said locking member.

8. An ejecting mechanism according to claim 7, in which said releasing lever is secured swingably in relative relation with said operating lever.

9. An ejecting mechanism according to claim 7, in which a lug is provided at the free end of said releasing lever, so as to be brought into contact with said locking member.

10. An ejecting mechanism according to claim 7, in which said pushing operation from the front side of said panel is performed through a hole which is provided in said panel.

11. An ejecting mechanism according to claim 10, in which said pushing operation from the front side of said panel is performed by hand by the use of a linear push member passed through said hole of the panel.

* * * * *